United States Patent
Kwak et al.

(10) Patent No.: US 11,487,854 B2
(45) Date of Patent: Nov. 1, 2022

(54) ELECTRONIC DEVICE FOR PROTECTING APPLICATION FROM ABNORMAL ENVIRONMENT AND OPERATING METHOD THEREOF

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Kuenhwan Kwak, Suwon-si (KR); Donguk Kim, Suwon-si (KR); Byunghoon Kang, Daejeon (KR); Minjoon Park, Daejeon (KR); Seongman Lee, Daejeon (KR); Daehee Jang, Daejeon (KR); Yunjong Jeong, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 22 days.

(21) Appl. No.: 17/051,544

(22) PCT Filed: Jun. 12, 2019

(86) PCT No.: PCT/KR2019/007076
§ 371 (c)(1),
(2) Date: Oct. 29, 2020

(87) PCT Pub. No.: WO2019/240485
PCT Pub. Date: Dec. 19, 2019

(65) Prior Publication Data
US 2021/0248212 A1   Aug. 12, 2021

Related U.S. Application Data

(60) Provisional application No. 62/685,005, filed on Jun. 14, 2018.

(51) Int. Cl.
*G06F 21/14* (2013.01)
*G06F 21/12* (2013.01)
(Continued)

(52) U.S. Cl.
CPC .......... *G06F 21/125* (2013.01); *G06F 9/4812* (2013.01); *G06F 12/14* (2013.01); *G06F 21/78* (2013.01); *G06F 2212/1052* (2013.01)

(58) Field of Classification Search
CPC ........ G06F 21/125; G06F 21/78; G06F 21/54; G06F 21/14; G06F 9/4812; G06F 2212/1052; G06F 12/14
See application file for complete search history.

(56) References Cited

U.S. PATENT DOCUMENTS 6,513,133 B1 * 1/2003 Campbell ........... G06F 11/3688
714/38.14
9,384,148 B2   7/2016 Muttik et al.
(Continued)

FOREIGN PATENT DOCUMENTS

CN      107729121 A      2/2018
KR   10-2016-0099672 A   8/2016

OTHER PUBLICATIONS

International Search Report (PCT/ISA/210) and Written Opinion (PCT/ISA/237) dated Sep. 10, 2019 by the International Searching Authority in counterpart International Patent Application No. PCT/KR2019/007076.
(Continued)

*Primary Examiner* — Matthew T Henning
(74) *Attorney, Agent, or Firm* — Sughrue Mion, PLLC

(57) ABSTRACT

Provided is a method of protecting an application from reverse engineering. The method includes registering, in an
(Continued)

electronic device, a handler capable of being called as a preset fault is generated in the application, after the handler is registered, executing a protection code for generating the preset fault in the application, determining whether an environment where the application is executed is an abnormal environment, based on whether the handler has been called as the protection code is executed, and performing an operation for protecting the application, based on a result of the determination.

15 Claims, 4 Drawing Sheets

(51) Int. Cl.
*G06F 9/48* (2006.01)
*G06F 12/14* (2006.01)
*G06F 21/78* (2013.01)

(56) References Cited

U.S. PATENT DOCUMENTS

| | | |
|---|---|---|
| 2002/0129301 A1 | 9/2002 | McKee et al. |
| 2007/0234430 A1 | 10/2007 | Goldsmid et al. |
| 2008/0263366 A1 | 10/2008 | Mauruthi |
| 2010/0275034 A1 | 10/2010 | Safa |
| 2013/0014256 A1* | 1/2013 | Krizenecky ............ G06F 21/54 |
| | | 726/23 |
| 2017/0111374 A1 | 4/2017 | Harris et al. |

OTHER PUBLICATIONS

Raffetseder, Thomas et al., "Detecting System Emulators", Information Security, 10th International Conference, ISC 2007, Oct. 9-12, 2007, (19 pages total).

* cited by examiner

ELECTRONIC DEVICE FOR PROTECTING APPLICATION FROM ABNORMAL ENVIRONMENT AND OPERATING METHOD THEREOF

TECHNICAL FIELD

The present disclosure relates to an electronic device for protecting an application from an abnormal environment, and an operation method of the electronic device.

BACKGROUND ART

With the development of reverse engineering technology, applications are reverse engineered, and important data of the applications are leaked. Reverse engineering technology refers to technology for analyzing a finished product in detail and tracing design contents. For example, when an application is executed in a virtual environment using an emulator that is one of the reverse engineering technologies, there is a risk that important data of the application may be leaked.

Data leaked due to reverse engineering can be used for technology duplication, policy bypass, security technology hacking, etc., and thus continuous damage may occur to those providing or using an application. Accordingly, a method of protecting an application from an abnormal environment caused by reverse engineering is required.

DESCRIPTION OF EMBODIMENTS

Technical Solution to Problem

Provided is an electronic device for protecting an application from an abnormal environment, and an operation method of the electronic device.

Provided is a non-transitory computer-readable recording medium having recorded thereon a computer program, which, when executed by a computer, performs the operation method.

MODE OF DISCLOSURE

Figure 1:
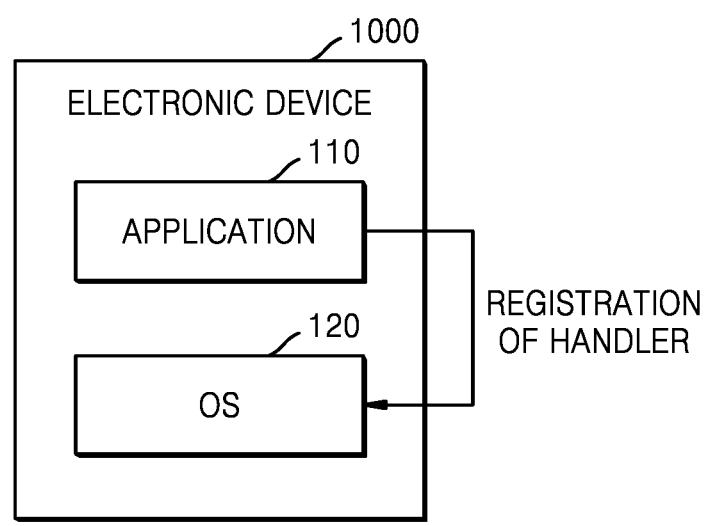
FIG. 1 is a block diagram of an internal structure of an electronic device according to an embodiment.

According to a first aspect of the present disclosure, a method of protecting an application from an abnormal environment includes registering, in the electronic device, a handler capable of being called as a preset fault is generated in the application; after the handler is registered, executing a protection code for generating the preset fault in the application; determining whether an environment where the application is executed is an abnormal environment, based on whether the handler has been called as the protection code is executed; and performing an operation for protecting the application, based on a result of the determining.

According to a second aspect of the present disclosure, an electronic device includes a memory storing one or more instructions; and a processor configured to execute the one or more instructions stored in the memory, wherein the processor registers, in the electronic device, a handler capable of being called as a preset fault is generated in the application, after the handler is registered, executes a protection code for generating the preset fault in the application, determines whether an environment where the application is executed is an abnormal environment, based on whether the handler has been called as the protection code is executed, and performs an operation for protecting the application, based on a result of the determination.

According to a third aspect of the present disclosure, a recording medium has recorded thereon a program for the method of the first aspect.

Embodiments of the disclosure are described in detail herein with reference to the accompanying drawings so that this disclosure may be easily performed by one of ordinary skill in the art to which the disclosure pertains. The disclosure may, however, be embodied in many different forms and should not be construed as being limited to the embodiments set forth herein. In the drawings, parts irrelevant to the description are omitted for simplicity of explanation, and like numbers refer to like elements throughout.

Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

The disclosure will now be described more fully with reference to the accompanying drawings, in which exemplary embodiments of the disclosure are shown.

FIG. 1 is a block diagram of an internal structure of an electronic device 1000 according to an embodiment.

Referring to FIG. 1, the electronic device 1000 may include an application 110 and an operating system (OS) 120 that may be executed therein. According to an embodiment, by registering a handler for the application 110 in the OS 120, it may be determined whether an execution environment of the application 110 is an abnormal environment or not. According to a result of the determination, an operation for protecting the application 110 may be performed.

In the electronic device 1000 according to an embodiment, the application 110 and the OS 120 may be executed. The electronic device 1000 may be implemented in various types. Examples of the electronic device 1000 may include, but are not limited to, a digital camera, a smartphone, a laptop computer, a tablet personal computer (PC), an electronic-book terminal, a digital broadcasting terminal, personal digital assistants (PDAs), a portable multimedia player (PMP), a navigation device, an MP3 player, and an artificial intelligence (AI) speaker.

The electronic device 1000 may also be a wearable device that is wearable by a user. The wearable device may include, but are not limited to, at least one of an accessory type device (e.g., a watch, a ring, a wrist band, an ankle, a necklace, eyeglasses, a contact lens), a head-mounted-device (HMD), a fabric or clothing integrated device (e.g., electronic clothing), a body-attached device (e.g., a skin pad), or a bio-implant device (e.g., an implantable circuit).

According to an embodiment, the application 110 executable in the electronic device 1000 is a software program capable of performing various types of operations by using various types of data, based on the OS 120 executed in the electronic device 1000.

According to an embodiment, the OS 120 executable in the electronic device 1000 is a software program that controls the hardware of the electronic device 1000 and provides an environment based on which the application 110 is executed.

According to an embodiment, the handler of the application 110 may be registered in the OS 120. For example, in the electronic device 1000, in response to a request to execute the application 110, the handler may be registered, and then other operations of the application 110 may be performed.

Embodiments are not limited to the above-described example, and a handler according to an embodiment may be registered according to pre-set information while the application 110 is being executed. For example, while the application 110 is being executed, when an operation requiring high security is performed, the handler according to an embodiment may be registered before the operation is performed. Based on the registered handler, it may be determined whether an environment where the application 110 is executed is an abnormal environment. According to a result of the determination, an operation of processing data requiring high security (e.g., an input of a password and processing of personal information) may be performed by the application 110, or an operation for protecting the application 110 may be performed.

The handler according to an embodiment is a code that may be called by the OS 120 when a preset fault is generated in the application 110. The preset fault may be generated as a protection code included in the application 110 is executed, after the handler is registered. For example, when execution of the application 110 is interrupted as the preset fault is generated by the protection code in the application 110, the handler may be called.

The protection code of the application 110 according to an embodiment may intentionally generate a fault in an operation of loading data from a memory 1700 so that the handler is called. For example, the OS 120 may identify the fault generated in the application 110 and may call a handler corresponding to the identified fault. The handler called by the OS 120 may perform an operation previously set in the handler, for example, an operation of correcting a protection code.

The application 110 according to an embodiment may include one or more instructions for performing various types of operations. According to an embodiment, one or more operations according to the one or more instructions may be sequentially performed, and thus the application 110 may be executed.

According to an embodiment, the instructions of the application 110 may be configured so that the handler is first registered, before another operation (e.g., an operation requiring high security) of the application 110 is performed. The instructions of the application 110 according to an embodiment may include an instruction for registering a handler in the OS 120. According to an embodiment, the instruction for registering a handler in the OS 120 may operate such that the handler is registered in the OS 120, based on information about the handler. The registered handler may be called by the OS 120 according to the information about the handler.

The information about the handler according to an embodiment may include information about a condition in which the handler is called. For example, the information about the condition in which the handler is called may include information for identifying a preset fault corresponding to the handler and generated by the protection code of the application 110. The information for identifying the preset fault may include information such as information about the characteristics of the preset fault and identification information of the protection code that generates the preset error.

The information about the characteristics of the preset fault according to an embodiment may include information indicating the type, characteristics, and the like of a fault that may be set under the calling condition of the handler. For example, the fault that may be set under the calling condition of the handler may be a fault generated in relation to data alignment. For example, the fault generated in relation to data alignment may be a fault that may be generated as a memory address for loading data stored in a memory is wrongly set, when operations according to the instructions of the application 110 are performed. Embodiments are not limited to the aforementioned example, and the fault that may be set under the calling condition of the handler may be any of various types of errors that may be generated by the protection code of the application 110.

The identification information of the protection code according to an embodiment may include information necessary for identifying a protection code corresponding to the handler according to an embodiment, such as a location of the protection code and information about an instruction included in the protection code. For example, a handler may be called by the OS 120, when execution of an application is interrupted due to a fault generated by a protection code corresponding to the handler.

According to an embodiment, as an operation for determining whether the execution environment of the application 110 is abnormal, after the handler is registered, an operation by the aforementioned protection code may be performed. The protection code according to an embodiment may be previously set as an instruction of the application 110 so that the protection code may be executed by the application 110 after the handler is registered.

According to an embodiment, as the protection code is executed, a preset fault due to the protection code may be generated, and, according to the execution environment of the application 110, an operation of the application 110 may be stopped or may continue without stopping.

According to an embodiment, when the execution environment of the application 110 is normal, the protection code may be executed, and thus an operation of the application 110 may be stopped. For example, when a fault related to data alignment is generated by the protection code, because a normal processor (e.g., a mobile processor) is unable to process the fault related to data alignment, execution of the application 110 may be terminated.

According to an embodiment, when the application 110 is terminated, the OS 120 may detect the termination of the application 110, and may call the handler, based on information about the handler pre-registered in the OS 120. For example, the OS 120 may analyze a cause of the termination of the application 110, and may call the handler, based on a result of the analysis and information about a handler calling condition. For example, the OS 120 may call the handler by detecting that a fault previously set in the information about a handler calling condition (e.g., a fault related to data alignment) is generated by the protection code identified according to the information about the handler calling condition.

According to an embodiment, when the handler is called, an operation by the handler may be performed. For example, when the handler is called as the protection code is executed, the protection code may be corrected by the called handler so that the preset fault is not generated again by the protection code.

According to an embodiment, after the protection code is corrected, the OS 120 may control the stopped application 110 to be re-executed. For example, the OS 120 may control the application 110 so that an operation by the application 110 is executed from the protection code, which is a location where a fault is generated in the application 110. For example, the protection code may be corrected by the called handler, and, according to the corrected protection code, an operation stopped due to the preset fault (e.g., an operation by the protection code) may be re-executed in the application.

According to an embodiment, the application 110 is executed according to the corrected protection code, and thus an operation by the protection code may be continuously executed without stopping.

According to an embodiment, when the execution environment of the application 110 is abnormal, an operation of the application 110 may be normally executed without stopping, due to execution of the protection code. For example, when a fault related to data alignment is generated, a processor used in an abnormal environment processes the generated fault, and accordingly, an operation of the application 110 may continue without being interrupted. Therefore, according to the processor used in an abnormal environment, even when an operation by the protection code is executed, the handler according to an embodiment may not be called.

According to an embodiment, a processor in which the application 110 is able to operate in a normal environment may be a processor mountable on a mobile device, such as a smartphone or a wearable device. For example, when a handler is called by the protection code of the application 110, it is determined that the application 110 is executed in a mobile device where an emulator is unable to operate, and thus the application 110 may be determined to be executed in a normal environment.

However, a processor used in an abnormal environment may be a processor of a desktop personal computer (PC) or a notebook PC where an emulator used in reverse engineering may operate. For example, when a handler is not called by the protection code of the application 110, it is determined that the application 110 is executed in a desktop PC or notebook PC where the above-described emulator is operable, and thus the application 110 may be determined to be executed in an abnormal environment where there is a risk that data of the application 110 is taken.

For example, even when the application 110 stored in the electronic device 1000 is delivered to a desktop PC or notebook PC by an unauthorized user without permission and executed, according to an embodiment, it may be determined whether an execution environment of the application 110 is abnormal, based on whether a handler is called, and thus the application 110 may be protected.

According to an embodiment, the application 110 may include an instruction for determining whether an execution environment of an application is abnormal, after an operation by the protection code is executed. Accordingly, according to the instruction, an operation of determining whether an execution environment of an application is abnormal may be performed, after the operation by the protection code is executed.

According to an embodiment, a determination as to whether the execution environment of the application 110 is abnormal or not may be made based on whether the handler has been called as the protection code is executed. For example, based on information about a history of the operations executed in the application 110, it may be determined whether the handler has been called as the protection code of the application 110 is executed.

According to an embodiment, when the handler is called, it may be determined whether the execution environment of the application 110 is a normal environment. On the other hand, when the handler is not called, it may be determined whether the execution environment of the application 110 is an abnormal environment.

According to an embodiment, when it is determined that the execution environment of the application 110 is a normal environment, the application 110 may continuously perform various operations including an operation that requires a high level of security.

On the other hand, according to an embodiment, when it is determined that the execution environment of the application 110 is an abnormal environment, an operation for protecting the application 110 may be performed. For example, the operation for protecting the application 110 may include an operation of converting important data of the application 110, an operation of allowing the application 110 to be forcibly terminated, and an operation of setting the application 110 such that an operation of the application 110 that requires security is not performed. Embodiments are not limited to thereto, and the operation for protecting the application 110 may include various operations for protecting data of the application 110 from an emulator, reverse engineering, and the like.

According to an embodiment, the operation for protecting the application 110 may be performed such that a user trying to take data by using an emulator may not easily discover another method of hindering performance of the operation for protecting the application 110 according to an embodiment. For example, the operation for protecting the application 110 may be performed so that an outside (e.g., a user who uses an emulator) may not know that the protecting operation is being performed.

Figure 2:
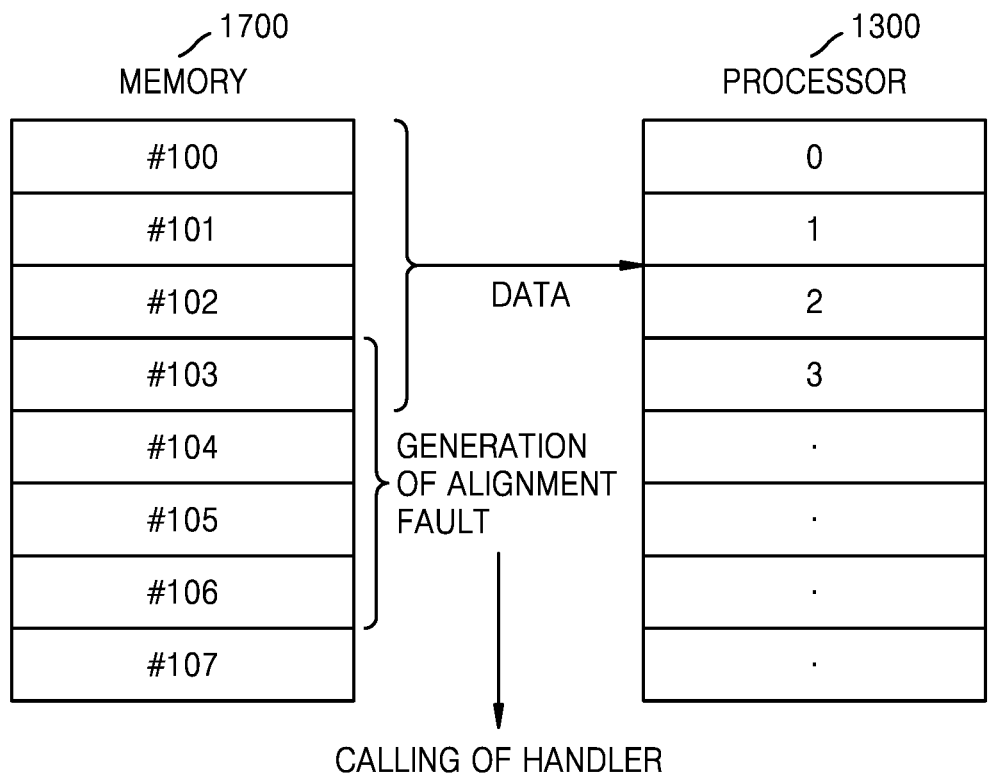
FIG. 2 is a view illustrating an example where a fault related to data alignment is generated, according to an embodiment.

FIG. 2 is a view illustrating an example where a fault related to data alignment is generated, according to an embodiment.

Referring to FIG. 2, by the protection code included in the application 110, a processor 1300 of the electronic device 1000 may perform an operation of accessing the memory 1700 of the electronic device 1000 to load data. The protection code of the application 110 according to an embodiment may intentionally generate a fault in an operation of loading data from the memory 1700 so that the handler is called.

The memory 1700 according to an embodiment may be set so that, according to a data alignment rule, data of the memory 1700 may be delivered to the processor 1300 in units of 4 bytes (e.g., data of #100 to #103) starting from data of a memory address #100. For example, 0, 1, 2, and 3 as data stored in memory addresses designated by an instruction for loading the data of the application 110 may be delivered to the processor 1300.

According to the data alignment rule according to an embodiment, a memory address indicated by the instruction for data loading need to be set as a number as a multiple of 4 such as a memory address #100, #104, or #108. According to an embodiment, as the memory address is set as a number as a multiple of 4, memory loading may be performed in units of 4 bytes. According to an embodiment, when the memory address of an instruction code for data loading is set as #101, #102, or #103 instead of a number as a multiple of 4 such as #100, #104, or #108, a fault related to data alignment may be generated.

The protection code according to an embodiment may include an instruction of accessing a memory address not conforming to the data alignment rule of the memory 1700, in order to intentionally generate the fault related to data alignment. For example, the protection code may include an instruction for data loading that indicates the memory address as #103. For example, the protection code may include an instruction for data loading of "LDM R1, [#103]". In "LDM R1, [#103]", LDM is a code that indicates memory loading, R1 indicates a register memory associated with the memory loading, and [#103] indicates a memory address for data loading. Embodiments are not limited thereto, and the instruction included in the protection code may include various types of instructions for intentionally generating the fault related to data alignment.

According to an embodiment, by the protection code, the fault related to data alignment may be generated, and thus a handler may be called from the OS 120.

However, even when an operation by the protection code is performed, when a handler is not called, it may be determined that the environment where the application 110 is executed is an abnormal environment, and an operation for protecting the application 110 may be performed.

Figure 3:
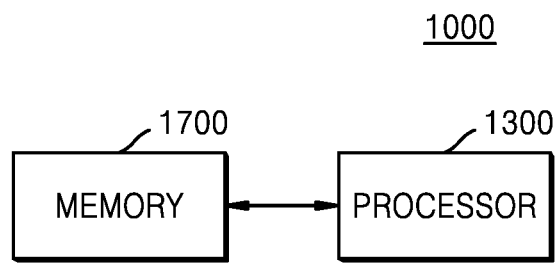
FIG. 3 is a block diagram of an internal structure of an electronic device according to an embodiment.

FIG. 3 is a block diagram of an internal structure of the electronic device 1000 according to an embodiment.

Figure 4:
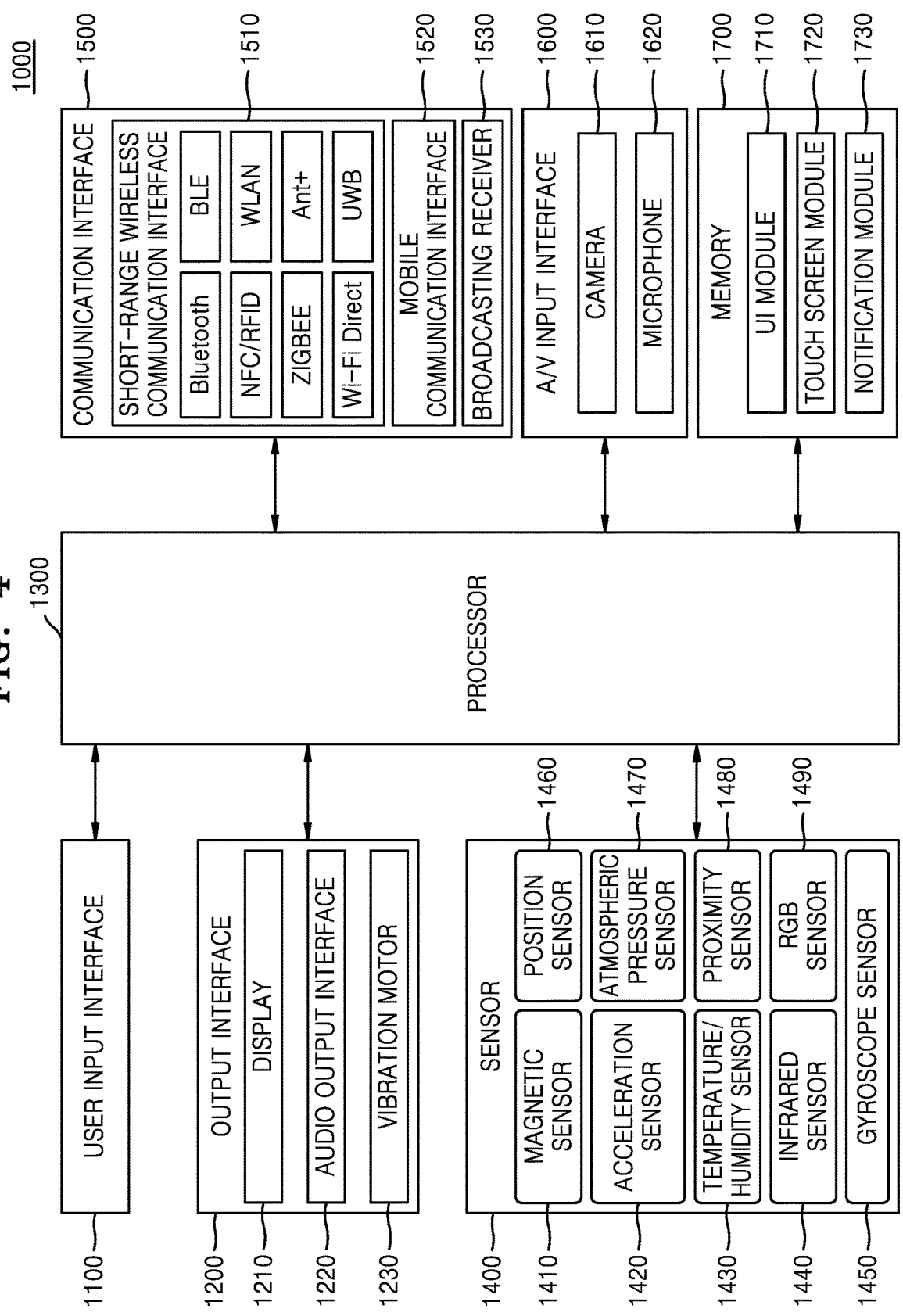
FIG. 4 is a block diagram of an internal structure of an electronic device according to an embodiment.

FIG. 4 is a block diagram of an internal structure of the electronic device 1000 according to an embodiment.

Referring to FIG. 3, the electronic device 1000 may include the memory 1700 and the processor 1300. All of the components illustrated in FIG. 3 are not essential components of the electronic device 1000. More or less components than those illustrated in FIG. 3 may constitute the electronic device 1000.

For example, as shown in FIG. 4, the electronic device 1000 according to an embodiment may further include a user input interface 1100, a sensor 1400, an output interface 1200, a communication interface 1500, and an audio/video (A/V) input interface 1600 in addition to the memory 1700 and the processor 1300.

The user input interface 1100 denotes a unit via which a user inputs data for controlling the electronic device 1000. For example, the user input interface 1100 may be, but is not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

According to an embodiment, the user input interface 1100 may receive a user input for executing the application 110.

The output interface 1200 may output an audio signal, a video signal, or a vibration signal, and may include a display 1210, an audio output interface 1220, and a vibration motor 1230.

The output interface 1200 may output a result of performing an operation according to the user input. For example, the output interface 1200 may output a result of executing an application according to the user input.

According to an embodiment, when it is determined that the application is executed in a normal environment instead of an abnormal environment, a result of normal execution of the application may be output. On the other hand, when it is determined that the application is executed in an abnormal environment, an operation for protecting the application may be performed, and a result of the performance of the operation may be output.

The display 1210 displays information that is processed by the electronic device 1000.

When the display 1210 forms a layer structure together with a touch pad to construct a touch screen, the display 1210 may be used as an input device as well as an output device. The display 1210 may include at least one of a liquid crystal display (LCD), a thin film transistor-liquid crystal display (TFT-LCD), an organic light-emitting diode (OLED), a flexible display, a three-dimensional (3D) display, or an electrophoretic display. According to embodiments of the electronic device 1000, the electronic device 1000 may include at least two displays 1210.

The audio output interface 1220 outputs audio data that is received from the communication interface 1500 or stored in the memory 1700.

The vibration motor 1230 may output a vibration signal. The vibration motor 1230 may also output a vibration signal when a touch screen is touched.

The processor 1300 typically controls all operations of the electronic device 1000. For example, the processor 1300 may control the user input interface 1100, the output interface 1200, the sensor 1400, the communication interface 1500, the AN input interface 1600, and the like by executing programs stored in the memory 1700. The electronic device 1000 may include at least one processor 1300.

The processor 1300 may be configured to process a command of a computer program, by performing basic arithmetic, logic, and input/output operations. The command may be provided from the memory 1700 to the processor 1300, or may be received via the communication interface 1500 and provided to the processor 1300. For example, the processor 1300 may be configured to execute the command according to a program code stored in a recording device, such as a memory.

As the application is executed, the processor 1300 according to an embodiment may register a handler of the application, and then execute a protection code for generating a fault related to data alignment. In addition, according to whether the handler has been called as the protection code is executed, the processor 1300 may determine whether an execution environment of the application is an abnormal environment, and may perform an operation for protecting the application, based on a result of the determination.

The sensor 1400 may sense a state of the electronic device 1000 or a state of the surrounding of the electronic device 1000 and may transmit information corresponding to the sensed state to the processor 1300.

The sensor 1400 may include, but is not limited thereto, at least one selected from a magnetic sensor 1410, an acceleration sensor 1420, a temperature/humidity sensor 1430, an infrared sensor 1440, a gyroscope sensor 1450, a position sensor (e.g., a global positioning system (GPS)) 1460, an atmospheric pressure sensor 1470, a proximity sensor 1480, and an RGB sensor 1490 (i.e., an illumination sensor).

According to an embodiment, information corresponding to the state sensed by the sensor 1400 may be used in various operations that are performed as the application is executed.

The communication interface 1500 may include at least one component that enables the electronic device 1000 to communicate with a server (not shown) or an external device (not shown). For example, the communication interface 1500 may include a short-range wireless communication interface 1510, a mobile communication interface 1520, and a broadcasting receiver 1530.

Examples of the short-range wireless communication interface 1510 may include, but are not limited to, a Bluetooth communication interface, a Bluetooth Low Energy (BLE) communication interface, a near field communication (NFC) interface, a wireless local area network (WLAN) (e.g., Wi-Fi) communication interface, a ZigBee communication interface, an infrared Data Association (IrDA) communication interface, a Wi-Fi direct (WFD) communication interface, an ultra wideband (UWB) communication interface, and an Ant+ communication interface.

The mobile communication interface 1520 may exchange a wireless signal with at least one selected from a base station, an external terminal, and a server on a mobile communication network. Here, examples of the wireless signal may include a voice call signal, a video call signal, and various types of data according to text/multimedia messages transmission.

The broadcasting receiver 1530 receives a broadcasting signal and/or broadcasting-related information from an external source via a broadcasting channel. The broadcasting channel may be a satellite channel, a ground wave channel, or the like. According to embodiments, the electronic device 1000 may not include the broadcasting receiver 1530.

The communication interface 1500 according to an embodiment may transmit predetermined data to the external device (not shown), due to the various operations that are performed as the application is executed.

The A/V input interface 1600 inputs an audio signal or a video signal, and may include a camera 1610 and a microphone 1620. The camera 1610 may acquire an image frame, such as a still image or a moving picture, via an image sensor in a video call mode or a photography mode. An image captured via the image sensor may be processed by the processor 1300 or a separate image processor (not shown). The microphone 1620 receives an external audio signal and converts the external audio signal into electrical audio data.

The A/V input interface 1600 according to an embodiment may generate an audio signal or a video signal, due to the various operations that are performed as the application is executed.

The memory 1700 may store a program used by the processor 1300 to perform processing and control, and may also store data that is input to or output from the electronic device 1000.

The memory 1700 according to an embodiment may store one or more instructions, and the at least one processor 1300 of the electronic device 1000 may perform an operation according to an embodiment by executing the one or more instructions stored in the memory 1700.

The memory 1700 according to an embodiment may store various pieces of information used for the application to be executed. As the application according to an embodiment is executed, due to the protection code, an operation of loading data stored in the memory 1700 may be performed, and a fault related to data alignment may be generated.

The memory 1700 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The programs stored in the memory 1700 may be classified into a plurality of modules according to their functions, for example, a user interface (UI) module 1710, a touch screen module 1720, and a notification module 1730.

The UI module 1710 may provide a UI, a graphical user interface (GUI), or the like that is specialized for each application and interoperates with the electronic device 1000. The touch screen module 1720 may detect a touch gesture on a touch screen of a user and transmit information regarding the touch gesture to the processor 1300. The touch screen module 1720 according to an embodiment may recognize and analyze a touch code. The touch screen module 1720 may be configured by separate hardware including a controller.

In order to detect an actual touch or a proximate touch on a touch screen, the touch screen may internally or externally have various sensors. An example of a sensor used to detect a touch on the touch screen is a tactile sensor. The tactile sensor denotes a sensor that detects a touch by a specific object to a degree to which a human feels or more. The tactile sensor may detect various types of information, such as the roughness of a touched surface, the hardness of the touching object, and the temperature of a touched point.

Examples of the touch gesture of the user may include tap, touch and hold, double tap, drag, panning, flick, drag and drop, swipe, and the like.

The notification module 1730 may generate a signal for notifying that an event has been generated in the electronic device 1000.

Figure 5:
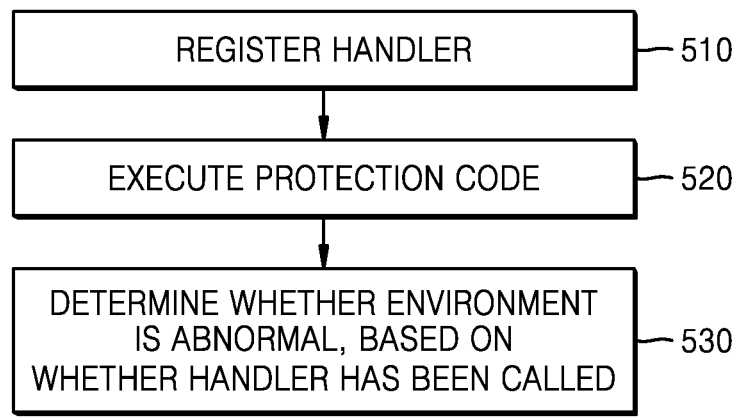
FIG. 5 is a flowchart of a method of protecting an application from an abnormal environment, according to an embodiment.

FIG. 5 is a flowchart of a method of protecting an application from an abnormal environment, according to an embodiment.

Referring to FIG. 5, in operation 510, the electronic device 1000 may register a handler that may be called as a preset fault is generated in the application. The handler according to an embodiment may be registered in the OS 120 executed in the electronic device 1000, the OS 120 may detect that the preset fault is generated, and the handler may be called.

In operation 520, the electronic device 1000 may execute a protection code for generating the preset fault in the application after the handler is registered in operation 510. The protection code according to an embodiment may be executed in the electronic device 1000, due to an instruction of the application configured to be executed after the handler is registered.

In operation 530, the electronic device 1000 may determine whether the handler registered in operation 510 has been called as the protection code is executed in operation 520. The electronic device 1000 according to an embodiment may determine whether an environment where the application is executed is an abnormal environment, based on whether the handler has been called.

According to an embodiment, when the handler has been called as the protection code is executed, the called handler may correct the protection code that generates the preset fault. The application may be re-executed according to the corrected protection code. For example, by calling the handler, the OS 120 may control the protection code to be corrected by the handler, and the protection code to be executed according to the corrected protection code. According to an embodiment, when the handler is called, after the application is re-executed according to the corrected protection code, operation 530 of determining, based on whether the handler is called, whether the execution environment of the application is an abnormal environment may be performed.

On the other hand, according to an embodiment, when the handler is not called even when the protection code is executed, after the protection code is executed, operation 530 of determining, based on whether the handler is called, whether the execution environment of the application is an abnormal environment may be performed. For example, even when the preset fault has been generated due to execution of the protection code, an operation of the application may be continuously executed without stopping, due to the characteristics of the execution environment of the application. For example, when the application is executed by a processor of a PC where an emulator is executable, instead of a processor usable in a mobile device, even when a data alignment fault is generated, an operation of the application may not be stopped. Accordingly, when it is determined that the handler is not called, after the protection code is executed, the electronic device 1000 according to an embodiment may determine that the execution environment of the application is an abnormal environment.

According to an embodiment, when the execution environment of the application is an abnormal environment, an operation for protecting the application may be performed. For example, various types of operations for protecting the application may be performed, according to information previously set in the application. Therefore, according to an embodiment, as various operations for protecting the application are performed, important data of the application may be protected even in an environment where an emulator is executed.

According to an embodiment, even when the application 110 executable in the electronic device 1000 is executed without permission in other devices where an emulator can be driven, it may be determined that the execution environment of the application 110 is an abnormal environment, and thus the application 110 may be protected.

An embodiment can also be embodied as a storage medium including instruction codes executable by a computer such as a program module executed by the computer. A computer readable medium can be any available medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, or the program module, and includes any information transmission medium.

The terminology "~unit" used herein may be a hardware component such as a processor or a circuit, and/or a software component that is executed by a hardware component such as a processor.

Although the embodiments of the disclosure have been disclosed for illustrative purposes, one of ordinary skill in the art will appreciate that diverse variations and modifications are possible, without departing from the spirit and scope of the disclosure. Thus, the above embodiments should be understood not to be restrictive but to be illustrative, in all aspects. For example, respective elements described in an integrated form may be dividedly used, and the divided elements may be used in a state of being combined.

While one or more example embodiments have been described with reference to the figures, it will be understood by those of ordinary skill in the art that various changes in form and details may be made therein without departing from the spirit and scope as defined by the following claims.

The invention claimed is:

1. A method of protecting an application from an abnormal environment in an electronic device, the method comprising:
   registering, in the electronic device, a handler capable of being called as a preset fault is generated in the application;
   after the handler is registered and as one type of operation among various types of operations of the application is performed, executing a protection code for generating the preset fault in the application, wherein the protection code is included in instructions for performing the operation;
   identifying whether the handler has been called as the preset fault is generated;
   determining whether an environment where the application is executed is the abnormal environment, based on whether the handler has been called; and
   performing an operation for protecting the application when the environment where the application is executed is the abnormal environment.

2. The method of claim 1, wherein the preset fault is a fault generated in relation to data alignment by the protection code in the application.

3. The method of claim 1, wherein the handler is called when execution of the application is interrupted as the preset fault is generated by the protection code.

4. The method of claim 1, wherein the protection code comprises an instruction to access a memory address not conforming to a data alignment rule of a memory of the electronic device.

5. The method of claim 1, wherein, when the handler is called as the protection code is executed, the protection code is corrected by the handler so that the preset fault is not generated again by the protection code.

6. The method of claim 5, wherein, after the handler is called, the application is re-executed according to the protection code corrected by the handler.

7. The method of claim 1, wherein, when the handler has been called as the protection code is executed, it is determined that the environment where the application is executed is a normal environment, and
   when the handler has not been called as the protection code is executed, it is determined that the environment where the application is executed is the abnormal environment.

8. An electronic device for protecting an application from an abnormal environment, the electronic device comprising:
   a memory storing one or more instructions; and
   a processor configured to execute the one or more instructions stored in the memory,
   wherein the processor registers, in the electronic device, a handler capable of being called as a preset fault is generated in the application,
   after the handler is registered and as one type of operation among various types of operations of the application is performed, executes a protection code for generating the preset fault in the application, wherein the protection code is included in instructions for performing the operation, determines whether an environment where the application is executed is the abnormal environment, based on whether the handler has been called, and performs an operation for protecting the application when the environment where the application is executed is the abnormal environment.

9. The electronic device of claim 8, wherein the preset fault is a fault generated in relation to data alignment by the protection code in the application.

10. The electronic device of claim 8, wherein the handler is called when execution of the application is interrupted as the preset fault is generated by the protection code.

11. The electronic device of claim 8, wherein the protection code comprises an instruction to access a memory address not conforming to a data alignment rule of a memory of the electronic device.

12. The electronic device of claim 8, wherein, when the handler is called as the protection code is executed, the protection code is corrected by the handler so that the preset fault is not generated again by the protection code.

13. The electronic device of claim 12, wherein, after the handler is called, the application is re-executed according to the protection code corrected by the handler.

14. The electronic device of claim 8, wherein, when the handler has been called as the protection code is executed, it is determined that the environment where the application is executed is a normal environment, and when the handler has not been called as the protection code is executed, it is determined that the environment where the application is executed is the abnormal environment.

15. A non-transitory computer-readable recording medium having a program recorded thereon to perform:

registering, in an electronic device, a handler capable of being called as a preset fault is generated in an application;

after the handler is registered and as one type of operation among various types of operations of the application is performed, executing a protection code for generating the preset fault in the application, wherein the protection code is included in instructions for performing the operation;

identifying whether the handler has been called as the preset fault is generated;

determining whether an environment where the application is executed is an abnormal environment, based on whether the handler has been called; and performing an operation for protecting the application when the environment where the application is executed is the abnormal environment.

* * * * *